(12) United States Patent
Collver et al.

(10) Patent No.: US 11,965,769 B2
(45) Date of Patent: Apr. 23, 2024

(54) SELF PROVING METER SYSTEM AND METHOD OF PROVING A METER

(71) Applicant: ROMET LIMITED, Mississauga (CA)

(72) Inventors: Brent Collver, Oakville (CA); Mohammadreza Soudmand-Asli, Toronto (CA); Frederick Joseph Maly, Jr., Oakville, MO (US)

(73) Assignee: ROMET LIMITED, Mississauga (CA)

( * ) Notice: Subject to any disclaimer, the term of this patent is extended or adjusted under 35 U.S.C. 154(b) by 127 days.

(21) Appl. No.: 17/507,452

(22) Filed: Oct. 21, 2021

(65) Prior Publication Data

US 2023/0130707 A1 Apr. 27, 2023

(51) Int. Cl.
*G01F 25/10* (2022.01)
*G01F 1/06* (2006.01)

(52) U.S. Cl.
CPC ............... *G01F 25/15* (2022.01); *G01F 1/06* (2013.01)

(58) Field of Classification Search
CPC .................................. G01F 25/10; G01F 25/15
See application file for complete search history.

(56) References Cited

U.S. PATENT DOCUMENTS

| | | | |
|---|---|---|---|
| 4,474,049 A | 10/1984 | Hansen et al. | |
| 4,965,756 A * | 10/1990 | Pearman | G01F 25/15 702/100 |
| 5,455,781 A * | 10/1995 | Reynal | G01F 25/13 700/282 |
| 5,600,073 A * | 2/1997 | Hill | G01F 1/74 73/30.03 |
| 5,866,824 A | 2/1999 | Schieber | |
| 2007/0192046 A1* | 8/2007 | Hairston | G01F 25/15 702/45 |
| 2008/0189054 A1 | 8/2008 | McAnally et al. | |
| 2009/0187356 A1* | 7/2009 | Artiuch | G01F 25/10 702/45 |
| 2011/0037598 A1* | 2/2011 | Day | G01F 1/74 340/606 |
| 2015/0260565 A1* | 9/2015 | Smirnov | G05D 7/0635 73/1.34 |
| 2019/0170563 A1* | 6/2019 | Lee | G01F 25/15 |
| 2020/0379423 A1* | 12/2020 | Wenzel | G06Q 50/163 |

OTHER PUBLICATIONS

Extended European Search Report dated May 8, 2023 for Corresponding European Patent Application No. 22275127.3; 10 Pages.

* cited by examiner

*Primary Examiner* — Herbert K Roberts (57) ABSTRACT

A method, meter and device capable of determining the accuracy, proof, or percent of error of a meter in service. The method is configured to establish one or more baseline flow measurements for the meter, the meter configured to measure a flow through the meter; obtain a current flow measurement for the meter; and determine a proving result in accordance with a comparing of the current flow measurement to the one or more baseline flow measurements.

22 Claims, 2 Drawing Sheets

SELF PROVING METER SYSTEM AND METHOD OF PROVING A METER

FIELD

The present disclosure relates to an apparatus and a method for determining a meter's accuracy at regular or predetermined intervals. The apparatus and method apply to all gas meters including positive displacement and interferential meters using multiple variables to determine the accuracy or abnormalities in a meter, such as a gas meter.

BACKGROUND

Testing of a gas meter determines its accuracy. By comparing the data of a reference standard against the data generated by the meter being tested the accuracy of the meter being tested can be determined. In the industry, this is called proving a gas meter. If the meter tested is out of tolerance it can be repaired or adjusted as necessary.

There are three primary ways to prove meter accuracy but each has drawbacks.

SUMMARY

There is provided a method, meter and computing device capable of determining the accuracy, proof, or percent of error of a meter in service.

In a first aspect, there is provided a method for proving a meter. The method comprises: establishing one or more baseline flow measurements for the meter, the meter configured to measure a flow through the meter; obtaining a current flow measurement for the meter; and determining a proving result in accordance with a comparing of the current flow measurement to the one or more baseline flow measurements.

In an embodiment, the method comprises performing one of a repair and a replacement of the meter responsive to the proving result being too fast or too slow.

In an embodiment, two or more baseline flow measurements are established for the meter and the step of establishing comprises executing an automated sampling of flow measurements over a baseline period and determining the two or more baseline flow measurements from the sampling. In an embodiment, the method comprises clustering the sampling of flow measurements by respective value to determine commonly experienced flow measurements during normal operating conditions for use as the two or more baseline measurements. In an embodiment, comparing the current flow measurement is responsive to a baseline selecting threshold to select one baseline measurement from among the two or more baseline measurements for use to determine the proving result.

In an embodiment, the current flow measurement is obtained from a plurality of flow measurement samples made at the meter. In an embodiment, a first plurality of samples is discarded in response to data volatility.

In an embodiment, comparing comprises using a lookup table relative to a respective one of the baseline measurements to determine the proving result.

In an embodiment, each of the one or more baseline flow measurements represents a respective flow at the meter during a respective normal operating condition.

In an embodiment, obtaining the current flow measurement is responsive to a scheduling of when to sample a flow of the meter to increase chances of duplicating a respective normal operating condition associated to one of the one or more baseline measurements.

In an embodiment, the current flow measurement is any of a time measurement, a count measurement and a flow rate measurement.

In an embodiment, the method comprises communicating an error in response to the proving result being too fast or too slow.

In an embodiment, a) the meter is a self-proving meter comprising a processing unit and the method is performed by the self-proving meter; or b) the method is performed by a remote computing device coupled for communication with the meter, the remote computing device receiving flow measurements from the meter for use to determine the proving result.

In an embodiment, the meter is any of a positive displacement meter and an inferential meter.

In an embodiment, the meter measures a flow of a fluid or a flow of electricity.

In an embodiment, the baseline flow measurements and the current flow measurement are uncorrected measurements; or the baseline flow measurements and the current flow measurement are corrected measurements.

In a second aspect there is provided a self-proving meter comprising a computing device configured to perform a method according to the first aspect and any embodiment thereof. For example, via the computing device, the self proving meter is configured to: establish one or more baseline flow measurements for the meter, the meter configured to measure a flow through the meter; obtain a current flow measurement for the meter; and determine a proving result in accordance with a comparing of the current flow measurement to the one or more baseline flow measurements.

In a third aspect there is provided a computing device configured to perform a method according to the first aspect and any embodiment thereof.

These and other aspects will be apparent to a person of ordinary skill.

The present concept is best described through certain embodiments thereof, which are described herein with reference to the accompanying drawings, wherein the same reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

DETAILED DESCRIPTION

Meter accuracy can be defined in three ways: Percent Proof, Percent Accuracy, or Percent Error. Percent of "Proof" is defined as the known reference standard's data compared to the meter being tested data. Percent of "Accuracy" is the inverse of the percent of "Proof". That is the meter being tested data is compared to the reference meter's data. The percent of "Error" is the meter being tested accuracy minus 100.

Mathematically these Terms can be Defined as:

a. Percent Proof=(data$_{ref}$/data$_{test}$)×100.

b. Percent Accuracy=(data$_{test}$/data$_{ref}$)×100 c. Percent Error=[(data$_{test}$/data$_{ref}$)×100]−100

This patent application applies to all gas meters, residential, commercial, industrial, and transfer custody. The method for applying self-proving a meter can be at the meter level, instrumentation, cloud services, an external device. The external device would receive inputs from the meter being tested.

The American National Standards Institute (ANSI) publishes a standard for the accuracy of rotary gas meters. This standard is referred to as the ANSI B109.3. On page 24 of this standard, the Meter Accuracy of a new rotary meter is defined in section 4.2.3. 4.2.3 Meter Accuracy—Meter Accuracy shall be 100+/−1% from approximately 20% to 100% of the meter's rated capacity. By applying this standard to a meter with a rated capacity of 3000 CFH, the meter being tested would be tested between flow rates of 20% @ 600 Cubic Feet Hours (CFH) through 100% @ 3000 CFH. The same 3000 CFH meter would be tested at 0.16667 Cubic Feet Second through 0.83334 CFS converting the hour to seconds.

If more fluid goes through the meter being tested than the reference data indicates, the meter being tested is considered to be a "fast" meter. If the reference data indicates that more fluid went through it than the meter being tested, the meter being tested is considered a "slow" meter.

Reference data includes the cubic feet of the fluid over time. Volume can also be measured by cubic meters or another applicable unit. Time can be measured in hours, minutes, and/or seconds. Reference data is traceable to some world standard. The period to validate reference data varies depending on government jurisdiction and/or company standards.

To increase the accuracy of the reference data and reduce measurement inaccuracy, gas laws can be applied to the reference and meter being tested data. The gas laws are referred to as Boyle's law on gas pressure and Charles's law on gas temperature. For example, if Boyles and Charles's law is applied to the percent proof the following equation will result:

a. Percent Proof=(data$_{ref}$/data$_{test}$)×(Pres$_{ref}$/Pres$_{test}$)×(Temp$_{test}$/Temp$_{Ref}$)×100 b. Percent Accuracy=(data$_{test}$ data$_{ref}$)×(Pres$_{test}$/Pres$_{ref}$)×(Temp$_{test}$/Temp$_{ref}$)×100 c. Percent Error=[(data$_{test}$ data$_{ref}$)×(Pres$_{test}$/Pres$_{ref}$)×(Temp$_{test}$ Temp$_{ref}$)×100]−100

There are currently three methods to determine the accuracy of a gas meter. These methods include manual/automatic bell proving, sonic nozzle proving, and transfer proving. These methods of proving to generate the reference data to compare with the meter being tested.

Bell proving consists of a cylinder, opened at the bottom, submerged in a tank of oil. The cylinder is measured, using instruments traceable to some standard, and the volume of the cylinder is calculated. As gravity is exerted on the cylinder air is forced out at a know flow rate, cubic feet per second, and moves through the meter being tested. The flow rate is determined by restricting the outlet of the meter. The data generated by the bell prover is compared to the meter being tested. The accuracy of the meter being tested can be determined by this data.

Sonic nozzle proving consists of a series of nozzles with different maximum flow rates. Sonic nozzle provers are calibrated using a bell prover. This establishes the traceability of the reference data to a standard. A fluid is forced through the meter being tested and a combination of nozzles. The combination of nozzles determines the flow rate. The data generated by the sonic nozzle prover is compared to the meter being tested. The accuracy of the meter being tested can be determined by this data.

Transfer proving consists of a rotary meter mounted on a cart to be transported to meters in operation at the utility's customer location. Transfer provers are calibrated using a bell prover. This establishes the traceability of the reference data to a standard. Fluid is forced through the meter being tested and a reference rotary meter. The flow rate is determined by restricting the reference rotary meter's outlet. The data generated by the transfer prover is compared to the meter being tested. The accuracy of the meter being tested can be determined by this data.

Each method of proving has inherent errors in its operation. There can be leaks between the reference and meter being tested, errors in flow rate created by reference, wear of mechanical parts on proving equipment, errors in prover clocks due to inadequate power sources, and errors in valve operations on prover. Other errors include pressure and temperature sensors on provers, quality of power supply for timing (and their ability to provide a consistent 60-hertz frequency), and how the proving equipment is treated. This is particularly important for transfer provers as these provers are bounced on trucks, stairs, and other job site obstacles.

In an embodiment, a self-proving meter will monitor its flow rate.

Gas meters are rated by the number of cubic feet per hour they measure at a maximum flow rate. A meter rated at flowing a maximum of 250 cubic feet per hour (CFH) is called a 250 meter. A meter rated at a maximum flow rate of 3000 cubic feet per hour is called a 3000 meter. And so on. The data generated includes the flow rate in cubic feet per hour.

For a meter's accuracy to be determined a flow rate needs to be established between 10% and 100% and compared to the reference (prover). For example, if pressure and temperature are constant, and a 3000 CFH meter is flowing fluid at 1500 CFH the meter's flow rate is 50%. After the meter being tested flows 100 CF through it, for 41.667 seconds, the prover compares how much flow went through it at the same time. If the prover meter registers 99 cubic feet through it, for 41.25 seconds, and the meter being tested passed 100 cubic feet in 41.667 seconds, the meter being tested, in proof, is considered 99%, and the meter is considered a fast meter. The calculation is below:

a. Based on cubic feet (cf):

i. Percent Proof=(data$_{ref}$/data$_{test}$)×100

1. Percent Proof=(99 cf/100 cf)×100=>99% Fast     b. Based in seconds (sec):

i. Percent Proof=(data$_{ref}$/data$_{test}$)×100

1. Percent Proof=(41.25 sec/41.667 sec)×100=>99% Fast All three methods (i.e. bell, sonic nozzle, and transfer proving) used to determine the accuracy of a meter apply the same concept. They compare the data they generate to the data generated by the meter being tested. The data that the proving equipment generates is the number of cubic feet over time that fluid passes through it. This data is determined using measuring devices traceable to a governmental standard.

In an embodiment, in accordance with a teaching herein, a meter is commissioned (e.g. manufactured and initially installed) to meet a governmental standard. Thereafter, from time to time, the meter is tested to generate a current measurement that is compared with a measurement by the meter that was previously generated under similar conditions and when the meter met the government standard. The current measurement may be within an acceptable threshold amount of the measurement previously generated or may be slow or fast. The self-proving approach eliminates a need to use physical proving equipment to later prove the meter. In an embodiment, previous measurement data is entered electronically into field equipment (such as a meter itself or a meter testing device) and/or a remotely located data store such as a database accessible via communication. In an embodiment, such a remotely located data store may be a cloud computing-based database.

Example A

The prover data, to establish a baseline for future comparisons, is the number of cubic feet each second (or the number of seconds for each cubic foot) under a known pressure, temperature, and specific gravity and/or supercompressability. If the data is the number of seconds per cubic foot it can be represented by the following including the error:

a. Equation 1

$y = (Seconds/Hour) \times (Cubic\ Foot/Hour) \times error$  i.

The flow rate is 600 Cubic Foot/Hour  1.

$y = (3600\ Seconds/Hr) \times (600^{-1} Cubic\ Foot/Hr) \times 1.0\ error$  2.

$y = 3600 \times 600^{-1} \times 1.0$  3.

$y = 6\ Seconds\ Cubic\ Foot$  4.

For example, equation 1 above can be used when the meter is new and first commissioned. This newly commissioned meter measures 1 cubic foot of gas every 6 seconds when the flow rate is 600 Cubit Feet/Hour (CFH).

Once a baseline has been established (see below regarding establishing a baseline) this reference data is stored in the filed equipment and/or in a remote location (e.g. cloud based data store as described). A baseline (e.g. the reference data) comprises one or more flow measurements at the meter that are to be used as measurements previously generated to compare with a later generated current measurement under similar conditions. A load on a meter may utilize different but repeatable amounts of gas for e.g. 600 CF/H, 400 CF/H and 300 CF/H. The flow at the meter at any time is likely to be one of these flows and a generation of a current measurement is likely to be associated to one of these example flows. A comparison may be performed accordingly, for example, discarding comparison results where the conditions of the current measurement and a measurement previously generated is not the same such as because the measurement previously generated was for a different flow.

As the meter is utilized for months or years, the meter wears from use, and the accuracy is affected by the quality of the gas being measured. This changes the meter's overall accuracy.

The accuracy can then be determined by the number of seconds for each cubic foot or the number of cubic feet for each second. When the accuracy changes, holding the volume measured constant, the amount of time for each cubic foot (e.g. applicable volume unit) measured can increase or decrease. Alternatively, if the number of seconds for each cubic foot is held constant, the number of cubic foot measured can increase or decrease.

For example, a meter is utilized for 5 years. The measured number of cubic foot per hour is measured by determining the number of seconds per cubic foot. This data can be referred from the original data to determine the accuracy of the meter.

The reference data can be in the form of an equation or lookup tables. For example, for a baseline of 600 CF/H, having a 6 second per cubic foot measurement, a table may be stored for time values about the 6 second amount with associated flow values determined according to Equation 1. In an embodiment, the lookup table may be used with a current measurement (e.g. as an index to the table, interpolating between values if necessary) to determine an associated flow and/or proof value (a ratio showing whether the meter is fast or slow). In an embodiment, the table may represent how many seconds it takes per cubic foot or may represent how many cubic feet flow per second.

For Example A, Table 1 is utilized in an embodiment. Historical (baseline) data showed when the meter was new or originally installed the flow rate was 600 cubic feet for each hour. Through time this flow rate changed to 601.4 cubic feet for each hour when the same conditions are present such that 600 CF/H are actually flowing at the meter. Therefore the number of seconds for each cubic foot changed.

TABLE 1

|  | Seconds | Cubic Foot | Seconds | Cubic Foot |
|---|---|---|---|---|
| After 5 Years => | 5.986 | 1 | 1 | 0.167056 |
|  | 5.987 | 1 | 1 | 0.167029 |
|  | 5.988 | 1 | 1 | 0.167001 |
|  | 5.989 | 1 | 1 | 0.166973 |
|  | 5.99 | 1 | 1 | 0.166945 |
|  | 5.991 | 1 | 1 | 0.166917 |
|  | 5.992 | 1 | 1 | 0.166889 |
|  | 5.993 | 1 | 1 | 0.166861 |
|  | 5.994 | 1 | 1 | 0.166834 |
|  | 5.995 | 1 | 1 | 0.166806 |
|  | 5.996 | 1 | 1 | 0.166778 |
|  | 5.997 | 1 | 1 | 0.16675 |
|  | 5.998 | 1 | 1 | 0.166722 |
|  | 5.999 | 1 | 1 | 0.166694 |
| Meter New => | 6 | 1 | 1 | 0.166667 |
|  | 6.001 | 1 | 1 | 0.166639 |
|  | 6.002 | 1 | 1 | 0.166611 |
|  | 6.003 | 1 | 1 | 0.166583 |
|  | 6.004 | 1 | 1 | 0.166556 |
|  | 6.005 | 1 | 1 | 0.166528 |

For example, when the meter was new, the meter passed 1 cubic foot of gas every 6 seconds. After 5 years the meter passes 1 cubic foot of gas every 5.986 seconds. This meter's proof is 99.7% accurate after five years. The table may store proof values associated to time values, as an example.

$$\frac{5.986}{6} = 0.997 => 99.7\%$$

Thus data generated by the meter being tested can be compared to baseline data when the meter was new or refurbished in various combinations to determine the proof, accuracy, or error of the meter being tested.

Establishing a Baseline for Determining Proving Results

The Examples above relate to comparing flow-related measurements for changes over time. Broadly, a current flow measurement is compared to a baseline flow measurement. A baseline flow measurement may be established in accordance with the following examples.

In a manual embodiment, with the meter installed and operating, the meter is configured to capture a current flow measured by the meter as a baseline flow measurement. For example, the meter is invoked to enter a manual capture mode. In response to a signal such as a button push or other input, the meter stores a current flow measurement as the baseline flow measurement. The current flow measurement may be a time measurement (e.g. time taken to count a defined number of revolutions), a count measurement (e.g. revolutions per defined amount of time), a flow rate as determined from time and/or revolutions, or other type of flow measurement or data determined from it. In an embodiment, the type of flow measurement is responsive to the manner in which the meter is configured to compare and present proving results. A lookup table may be established responsive to time, count or flow rate and used accordingly.

In an embodiment, two or more manually determined baseline measurements are established, for example, representing different common flow rates at the meter. Typically the different common flow rates are materially different (e.g. by 10% or more). In an embodiment, respective baselines are established when a load device or devices connected to the meter are consuming gas under typical use conditions to be measured by the meter and which conditions are likely (or are desired) to be sampled for comparison purposes. By way of example, assume the meter is connected to three separate load devices A, B and C. Device A runs periodically but independently of devices B and C. Devices B and C always run together and also run periodically. The load devices are operated in typical combinations experienced at the installation and baselines established accordingly. Baselines may be established for when A is running alone, when A is running with B and C, and when B and C are running without A. A baseline may be established when no load is running.

In an automated embodiment, with the meter installed and operating, the meter is configured to randomly sample flow measurements over a baseline determination period of time. In an example, the meter determines a plurality of flow measurements at various times of day and on different dates (e.g. at 12:00 AM, 6:00 AM, 12:00 PM and 6:00 PM on each day of the week for a period of weeks). The measurements may be clustered (by the value of the measurement) to determine the respective common flow measurements. Responsive to the clustering at least some of the common flow measurements are used to establish the baseline measurements and are stored accordingly.

In an embodiment, the baseline is determined in a different manner than described in the manual or automated examples above. For example, baseline measurements may be input and stored based on historical data and/or knowledge of the usage patterns of the load devices connected to the meter.

In an embodiment (e.g. any of the manual or automated embodiments or otherwise), a baseline measurement may be communicated to a remote device for storage and/or use for determining proving results. Similarly, in an embodiment (e.g. any of the manual or automated embodiments or otherwise), current flow measurements taken to compare against the baseline or baselines may be communicated to a remote device for storage and/or use for determining proving results.

In an embodiment (e.g. any of the manual or automated embodiments or otherwise), a current flow measurement for use to determine a baseline or a measurement to compare to a baseline, may be any one of a single measurement, an average of multiple measurements (e.g. taken within X minutes of receiving the signal) or another measurement (e.g. a highest or lowest measurement from a plurality of sample measurements). If a plurality of sample measurements has too much volatility, the samples may all be discarded. For example, volatility may represent a ramping scenario where a load device consuming gas is initiating or stopping consumption. In an embodiment, if the meter experiences volatility for a number of consecutive attempts to establish a current flow measurement, the meter is configured to store or communicate (or both) an error message or alarm (or both).

In an embodiment (e.g. any of the manual or automated embodiments or otherwise), to improve the chances that the current flow measurement that is used to determine proving results is taken under similar conditions to a single baseline flow or a one of the respective multiple baseline measurements so that the two measurements are comparable, the meter is configured to sample current flow measurements under similar conditions. For example, time and/or date related data is established to instruct the meter when to take samples, where the time and/or date related data relate to instances where the flow rate is expected to be the same as the baseline flow rate or a respective baseline flow rate. This configuration data for when to take current flow measurements may be determined based upon historical data within the installation environment, as an example. In an automated example, the meter may be configured to determine the time/day of the week data from the samples taken and used (e.g. via clustering) to establish the baseline measurements.

In an alternative embodiment to setting configuration data, such as when more than one baseline measurement is established, current flow measurements are taken periodically but in a more random manner (e.g. without an expectation that a sample matches a particular baseline condition). The current flow measurement is compared to the baseline measurements. A threshold may be used to determine the proving result. For example, if the comparison shows that the meter is >=X % fast or slow compared to a particular baseline, that result may be discarded. Or if the comparison shows that the results are <=Y % difference (e.g. a small difference) of the baseline, whether fast or slow, that result is selected. The values of the baseline selecting thresholds of X and Y may be determined according to the following examples. For X, the difference between two similar baseline measurements may be determined and a percentage of the difference used. For Y, an expectation or tolerance of how much the meter may deteriorate over a period of time may be used. Other manners may be used to establish the threshold.

If a load-related configuration or use has changes such as a newly coupled or uncoupled load to the meter or increased or decreased use by a load has occurred, previously established baselines may no longer be accurate or complete and new baselines may be established such as described herein. In an embodiment, previously established baselines are removed to establish fresh baselines. In an embodiment, the meter is configured to detect when established baselines are no longer accurate or complete. In an embodiment, should the comparison of a plurality of current measurements to the established baselines fail to find a match, for example, after a defined number of attempts, which attempts may be made over a number of days or weeks or other period(s), an alarm is logged and reported. In an example, one or more new baselines are then established, such as by an operator intervention or other manner. Responsive to the alarm, for example, an operator may operate a manual establishment or trigger an automatic establishment of one or more new baselines.

Figure 1:
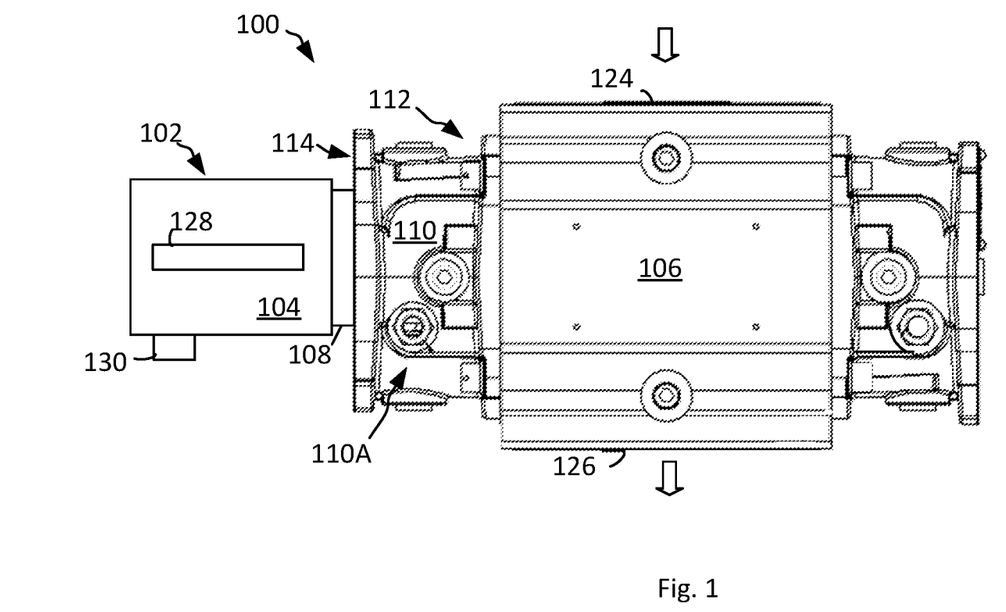
FIG. 1 is an illustration of a self-proving positive displacement rotary meter according to an embodiment.

FIG. 1 shows an embodiment of a rotary meter 100 with an electronic gas meter platform 102 configured to self-proving meter 100 in accordance with an embodiment. Electronic gas meter platform 102 provides a main control unit for the rotary meter. In an embodiment, electronic gas meter platform 102 may provide a foundation of a self-prover system, defining a main control unit for the self-prover system as well. Electronic gas meter platform 102 has a platform housing 104. In FIG. 1, platform housing 104 is mounted to a rotary meter housing 106 of meter 100 via a mounting bracket 108. As shown in FIG. 1, mounting bracket 108 may couple to a magnetic meter housing 110 on one end of rotary meter housing 106. Internally to magnetic meter housing 110 there is a chamber 112 (not illustrated) having a magnetic meter 114 (not illustrated) that is responsive to the rotation of a shaft driven by a rotary impeller in rotary meter housing 106 to measurement a flow of fluid through the rotary gas meter 100. While a magnetic based measurement is described, other methodologies may be used.

Rotary meter 100 is configured for vertical orientation. That is, meter 100 has flow inlet 124 and outlet 126 vertically aligned such that a fluid (e.g. a gas) flows vertically through the meter. Electronic gas meter platform 102 also comprises a user interface 128 which, in an embodiment, comprises an output device such as described below. User interface 128 may comprise buttons, keys, etc. for input.) In an embodiment, electronic gas meter platform 102 also comprises a communication interface 130 such as for coupling to another computing device. Communication interface 130 may be wired or wireless (such as described below) or the electronic gas meter platform 102 may comprise both a wired and a wireless communication interface.

Figure 2:
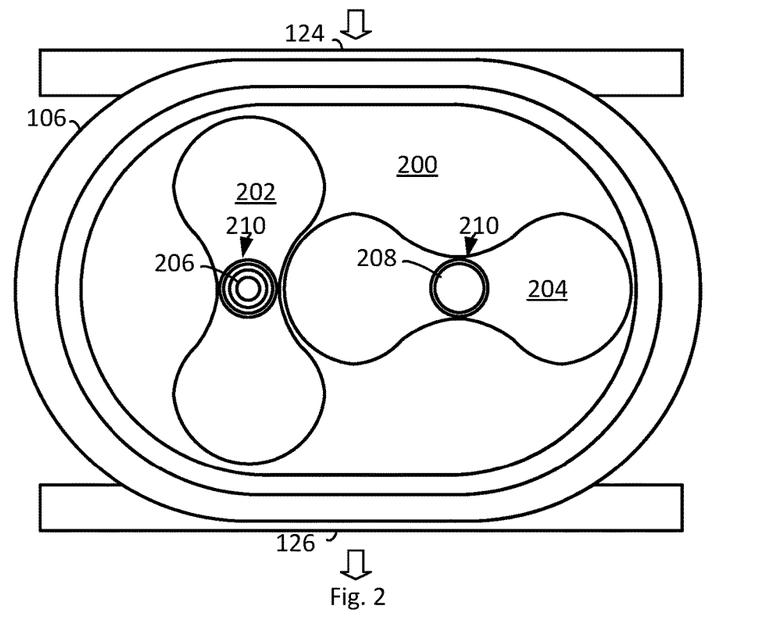
FIG. 2 is a meter housing of FIG. 1, in accordance with an embodiment.

FIG. 2 shows an interior 200 of housing 106, in an end view of meter 100. The view is enlarged relative to FIG. 1. Rotary meter housing 106 houses driven members such as a pair of rotary impellers 202 and 204. Interior 200 houses impellers 202 and 204 that are driven by the flow of fluid and the rotation of which impellers may be used to measure fluid rate and volume measurements. Rotary impellers rotate on a respective shaft such as shafts 206, 208 and are supported by bearings (generally indicated at 210 for shaft 206 and 212 for shaft 208).

Gearing (not shown) may be driven such as by impeller shaft 206 of impeller 202. The gearing may drive a mechanical counter such as for measuring volume, etc. Magnetic meter 114 may also be responsive to rotation of shaft 206 such as for an electronic counter or other measurements (e.g. flow). As well, timing gears (not shown) may be present to synchronize the respective rotation of the impellers.

Figure 3:
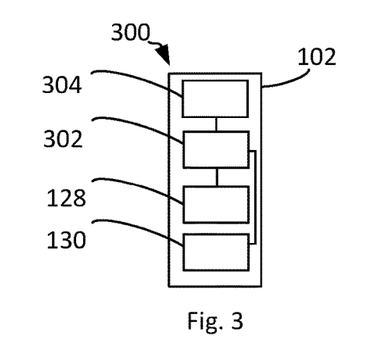
FIG. 3 is a block diagram of a self-proving meter system 300, in accordance with an example.

FIG. 3 is a block diagram of a self-proving meter system 300 in accordance with an example. In FIG. 3, self-proving meter system 300 comprises electronic gas meter platform 102 and magnetic meter 114 for monitoring flow rate. It is understood that other parameters may be monitored by platform 102 using applicable sensors, etc. (all not shown) such a pressure, temperature, oil condition and other parameters.

In an embodiment, electronic gas meter platform 102 comprises a processor 302, a storage device 304 as well as user interface 128. Processor 302 is coupled electronically to storage device 304 and user interface 128. In an embodiment, electronic gas meter platform 102 further comprises communication interface 130, which is coupled electronically to processor 302. In an embodiment, storage device 304 stores reference data as described with which to prove the meter. In an embodiment, reference data may comprise a look-up table such as described herein at Table 1. In an embodiment, lookup table data may include a representation of each respective time data value as a percentage of a baseline time data value for the meter when calibrated where the time data value is the number of seconds the meter takes to pass a baseline volume of gas (e.g. 6 seconds to pass 1 CF of gas).

Each of the user interface 128 and the communication interface 130 provide an alarm signaling interface controllable by processor 302 to signal an alarm, whether remotely and/or locally to the rotary meter.

In an embodiment, processor 302 is configured to communicate data or other signals to a remote computing device (See FIG. 4) via communication interface 130. In an embodiment, data communicated comprises flow data with which to prove the meter. In an embodiment, processor 300 determines current flow data (e.g. number of seconds per cubic foot) and proves the current flow data against reference data stored for the meter such as in storage device 304. Processor 300 may prove the data using an equation or a look-up table. Processor 300 may communicate the result of the proving to another communication device. In an embodiment, if the result is outside a threshold, processor 300 signals an alarm via an alarm signaling interface.

Processor 302 may be a microprocessor, a microcontroller or other. Processor 302 may be implemented as a processor core, central processing unit (CPU) or other.

Storage device 304 may comprise a memory such as a programmable memory, for example, an electrically erasable read-only memory (EEPROM).

User interface 128 may be any one or more of a display screen, a light, a bell or other output device that may signal an alarm. It may be preferred to display the differential pressure value and/or alarm.

Communication interface 130 may be a component of the electronic gas meter platform. Communication interface 130 may be coupled to a short range and/or long range communication devices (not shown) providing an external communication device. Short range and/or long range communication devices may comprise an antenna and associated circuits. In an example, not shown, a short range or long range communication device (or both) may be on-board and internal to the rotary meter 100. A short range and/or long range communication device may be configured to communicate using known protocols or standards such as to communicate short message service (SMS) messages/text messages via a cellular network, messages via a Bluetooth™ network or Zigbee™ network, etc. (Bluetooth is a trademark of Bluetooth SIG, Inc. Zigbee is a trademark of Zigbee Alliance). Such messages may be alarm messages or data reporting messages or both. Wired communication interface may comprise a universal serial bus (USB), RS-232, Ethernet or other standard interface or a proprietary interface. Wired communication interface 130 may also provide access to storage device 304 such as for providing programming. However other interfaces or means to program storage device 304 may be provided.

The electronic meter platform 102 may control a logging of the proving and any alarm in a log (e.g. in storage device 304). The storage device may be controlled to log the data including the alarm. Various logging techniques and practices may be used to record and/or report data such as at specific time intervals, for example. A log entry may include data representing specific values and flags such as an alarm flag where a flag may be dedicated to an oil level alarm. Log data may include respective timestamp data.

Processor 302 of the self-proving metering system may be programmed to periodically perform proving (e.g. via a wakeup).

In an embodiment, for example, for a meter having a self-proving meter system, operations of the meter system store proving data and/or an equation for proving to a storage device. In an example, proving data includes time data related to flow data, such as the number of seconds that the meter takes to pass a (baseline) volume of gas (e.g. 6 seconds to pass 1 cubic foot of gas). In an embodiment, the proving data represents time data associated with a flow for the meter when it is calibrated and measuring accurately, traceable to a government standard.

Following operation of the meter for a period of time, operations determine current data via measurement of a current gas flow for comparison against the proving data. The operations may use the equation to determine the current number of seconds that the meter takes to pass the baseline volume of gas, as an example. Operations may store the current data (e.g. current gas flow and/or current number of seconds). Operations compare the current data to the proving data, for example, to determine whether the meter is fast or slow. In an embodiment, a lookup table may be used. For example, a lookup table may be defined that relates the number of seconds to pass the baseline to a percentage of the number of seconds the meter took to pass the baseline when calibrated.

In addition to computing device aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects stored herein.

Meters that are operating while in service correct their volume and flow rate for pressure, temperature, and supercompressability electronically. These meters apply these correction factors to the uncorrected usage and flow rate to establish a corrected flow rate. For example:

Atmospheric Pressure=14.55      a.

Base Pressure=14.73      b.

Atmospheric Temperature (Absolute Zero)=(460°+55°) F.=515° F.      c.

Base Temperature (Absolute Zero)=(460°+60°) F.=520° F.      d.

In an embodiment, uncorrected measurements are used for baseline and current measurement comparisons. In an embodiment, corrected measurements are used for baseline and current measurement comparisons. It is preferred to have the same conditions for baseline and current measurements and use the same type of data for each.

The techniques and teachings herein lend themselves to meters of different types including positive displacement and inferential meters, e.g. turbine, ultra sound, etc. In a gas metering embodiment, the gas may comprise natural gas, a mixed gas, etc. Different units may apply for different measured flows (e.g. volumes or other amounts) depending upon standard practices for such meters.

This concept can also be used for electric and water meters. For electric meters, the units could be watts for each second. For water meters, the units could be gallons for each second.

The general inventive concepts described herein are not limited to any single context and may apply to various contexts or applications. In particular, while a natural gas context is described herein, a person of ordinary skill in the art will appreciate that other fluid distribution contexts may apply including other gases, water, and oils.

Natural gas or fossil gas is an odorless naturally occurring hydrocarbon gas mixture consisting primarily of methane but can include varying amounts of other higher alkanes, and sometimes a small percentage of carbon dioxide, nitrogen, hydrogen sulfide, or helium. Natural gas is used as a source of energy for heating, cooking, electricity generation, fuel for vehicles, as well as other processes in various industries.

A self-proving apparatus measures the pressure, temperature, supercompressability, and flow of natural gas and may come in the form of self-proving functions in various devices.

A self-prover is a precision measuring instrument that is manufactured to determine various accuracy, proofs, and errors in various meters.

Figure 4:
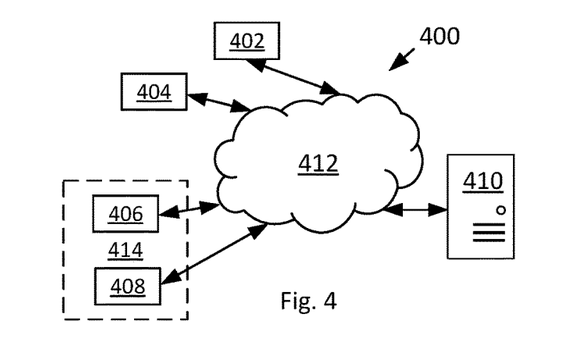
FIG. 4 is a diagram of a computer network where a plurality of meters are coupled to a server providing proving services over the network, in accordance with an example.

FIG. 4 is a diagram of a computer network system 400, according to an example, where a plurality of meters 402, 404, 406 and 408 are coupled to a server 410 providing proving services via a communication network 412. Network 412 is simplified and may comprise wired or wired networks and may comprise public or private networks and combinations of any of these. In an embodiment, network 412 comprises the Internet. In an embodiment, server 410 provides a cloud-based service.

Respective meters 402, 404, 406 and 408 may be at a same location (e.g. 414) or different locations.

Each meter is configured to sample measurements flow data such as described herein for proving the respective meter and communicate measurements to server 410. The respective measurements are associated with a meter identifier, for example, to distinguish the measurements. In an embodiment, server 412 is configured to compile the measurements respectively to determine reference data for a respective meter for use to later prove the meter using later flow measurements. In an embodiment, the reference data is a look-up table such as is described herein.

In an embodiment, the reference data for a particular meter (e.g. 402) is communicated from the server 410 to the particular meter 402 so that the meter 402 may perform its own respective proving, as described from later sampled measurements (flow data). In an embodiment, proving results are sent to server 410. In an embodiment, should particular meter 402 determine that the reference data does not meet current loads on the meter (e.g. for reasons as described above herein), meter 402 may communicate a request to server 410 to establish updated reference data.

In an embodiment, server 410 maintains and uses the reference data for a particular meter and receives flow measurements from time to time from the particular meter (e.g. 406) to prove the particular meter 406 using the reference data. In an embodiment, if the server's 410 proving results show the meter 406 is too fast or too slow (e.g. based on a threshold or thresholds) server 410 may signal an alarm and trigger a repair or replacement for meter 406. Server 410 may communicate an alarm to meter 406 for local signaling via an interface of the meter 406. In an embodiment, should server 410 determine that the reference data for meter 406 does not meet current loads on the meter 406 (e.g. for reasons as described above herein), server 410 may establish updated reference data from flow data received from meter 406.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A method for proving a meter configured to measure flow volume or flow rate through the meter, the method comprising:

establishing one or more baseline flow volume or flow rate measurements for the meter, wherein the one or more baseline flow volume or flow rate measurements comprise measurements established manually at a plurality of load states of a system connected to the meter comprising a plurality of separate load devices, the load states comprising a load of the connected system of each of the plurality of separate load devices independently, and a plurality of combinations of the plurality of separate load devices;

obtaining a current flow volume or flow rate measurement for the meter, the current flow volume or flow rate determined in accordance with flow driven rotation within the meter, wherein the current flow volume or flow rate measurement comprises a measurement of the system corresponding to one of the plurality of load states; and determining a proving result in accordance with a comparing of the current flow volume or flow rate measurement corresponding to one of the plurality of load states with a corresponding baseline measurement of the one or more baseline flow volume or flow rate measurements, wherein the proving result comprises one or more of percent proof, percent accuracy or percent error for the meter.

2. The method of claim 1, comprising performing one of a repair and a replacement of the meter responsive to the proving result and a threshold.

3. The method of claim 1, wherein two or more baseline flow volume or flow rate measurements are established for the meter in accordance with flow driven rotation within the meter and wherein the step of establishing comprises executing sampling of flow volume or flow rate measurements over a baseline period and determining the two or more baseline flow volume or flow rate measurements from the sampling.

4. The method of claim 3, comprising clustering the sampling of flow volume or flow rate measurements by respective value to determine commonly experienced flow volume or flow rate measurements during normal operating conditions for use as the two or more baseline flow volume or flow rate measurements.

5. The method of claim 3, wherein comparing the current flow volume or flow rate measurement is responsive to a baseline selecting threshold to select one baseline flow volume or flow rate measurement from among the two or more baseline flow volume or flow rate measurements for use to determine the proving result.

6. The method of claim 1, wherein the current flow volume or flow rate measurement is obtained from a plurality of flow volume or flow rate measurement samples made at the meter.

7. The method of claim 6, wherein a first plurality of samples is discarded in response to data volatility.

8. The method of claim 1, wherein comparing comprises using a lookup table relative to a respective one of the baseline flow volume or flow rate measurements to determine the proving result.

9. The method of claim 1, wherein each of the one or more baseline flow volume or flow rate measurements represents a respective flow at the meter during a respective normal operating condition.

10. The method of claim 1, wherein obtaining the current flow volume or flow rate measurement is responsive to a scheduling of when to sample a flow of the meter to increase chances of duplicating a respective normal operating condition associated to one of the one or more baseline flow volume or flow rate measurements.

11. The method of claim 1, wherein the current flow volume or flow rate measurement is any of a time measurement, a count measurement and a flow rate measurement.

12. The method of claim 1 comprising communicating the percent proof, percent accuracy or percent error in response to the proving result compared to a threshold.

13. The method of claim 1, wherein one of the following:
the meter is a self-proving meter comprising a processing unit and the method is performed by the self-proving meter; or
the method is performed by a remote computing device coupled for communication with the meter, the remote computing device receiving flow volume or flow rate measurements from the meter for use to determine the proving result.

14. The method of claim 1, wherein the meter comprises a positive displacement meter.

15. The method of claim 1, wherein one of:
the baseline flow volume or flow rate measurements and the current flow volume or flow rate measurement are uncorrected measurements; or
the baseline flow volume or flow rate measurements and the current flow volume or flow rate measurement are corrected measurements.

16. The method of claim 1, wherein:

Percent Proof=$(data_{ref}/data_{test}) \times (Pres_{ref}/Pres_{test}) \times (Temp_{test}/Temp_{ref}) \times 100$;

Percent Accuracy=$(data_{test}/data_{ref}) \times (Pres_{test}/Pres_{ref}) \times (Temp_{test}/Temp_{ref}) \times 100$; and Percent Error=$[(data_{test}/data_{ref}) \times (Pres_{test}/Pres_{ref}) \times (Temp_{test}/Temp_{ref}) \times 100] - 100$;

wherein $data_{ref}$ comprises the one or more baseline flow volume or flow rate measurements, $data_{test}$ comprises the current flow volume or flow rate measurement, $Pres_{ref}$ comprises a pressure value related to the one or more baseline flow volume or flow rate measurements, $Pres_{test}$ comprises a pressure value related to the current flow volume or flow rate measurement, $Temp_{ref}$ comprises a temperature value related to the one or more baseline flow volume or flow rate measurements, and $Temp_{test}$ comprises a temperature value related to the current flow volume or flow measurement.

17. The method of claim 1, wherein the plurality of load states comprises a no load state wherein each of the plurality of separate load devices is contributing no load to the system.

18. The method of claim 1, wherein the plurality of load states comprises a load state wherein the plurality of load devices are consuming gas under standard use conditions.

19. A self-proving meter comprising a computing device configured to:
provide a manual capture mode in response to receiving an input;
receive a capture input in the manual capture mode;
in response to receiving the capture input, establish one or more baseline flow volume or flow rate measurements for the meter, the meter configured to measure a flow through the meter in accordance with flow driven rotation within the meter, wherein the one or more baseline flow volume or flow rate measurements comprise measurements established manually at a plurality of load states of a system connected to the meter comprising a plurality of separate load devices, the load states comprising a load of the system of each of the plurality of separate load devices independently, and a plurality of combinations of the plurality of separate load devices;
obtain a current flow volume or flow rate measurement for the meter in accordance with flow driven rotation within the meter, wherein the current flow volume or flow rate measurement comprises a measurement of the system corresponding to one of the plurality of load states; and
determine a proving result in accordance with a comparing of the current flow volume or flow rate measurement corresponding to one of the plurality of load states with a corresponding baseline measurement of the one or more baseline flow volume or flow rate measurements, wherein the proving result comprises one or more of percent proof, percent accuracy or percent error for the meter.

20. The self-proving meter of claim 19, wherein:

Percent Proof=$(data_{ref}/data_{test}) \times (Pres_{ref}/Pres_{test}) \times (Temp_{test}/Temp_{ref}) \times 100$;

Percent Accuracy=$(data_{test}/data_{ref}) \times (Pres_{test}/Pres_{ref}) \times (Temp_{test}/Temp_{ref}) \times 100$; and Percent Error=$[(data_{test}/data_{ref}) \times (Pres_{test}/Pres_{ref}) \times (Temp_{test}/Temp_{ref}) \times 100] - 100$;

wherein $data_{ref}$ comprises the one or more baseline flow volume or flow rate measurements, $data_{test}$ comprises the current flow volume or flow rate measurement, $Pres_{ref}$ comprises a pressure value related to the one or more baseline flow volume or flow rate measurements, $Pres_{test}$ comprises a pressure value related to the current flow volume or flow rate measurement, $Temp_{ref}$ comprises a temperature value related to the one or more baseline flow volume or flow rate measurements, and $Temp_{test}$ comprises a temperature value related to the current flow volume or flow measurement.

21. A computing device comprising circuitry configured to:
provide a manual capture mode in response to receiving an input;
receive a capture input in the manual capture mode;
in response to receiving the capture input, establish one or more baseline flow volume or flow rate measurements for a meter, the meter configured to measure a flow through the meter in accordance with flow driven rotation within the meter, wherein the one or more baseline flow volume or flow rate measurements comprise measurements established manually at a plurality of load states of a system connected to the meter comprising a plurality of separate load devices, the load states comprising a load of the connected system of each of the plurality of separate load devices independently, and a plurality of combinations of the plurality of separate load devices;
obtain a current flow volume or flow rate measurement for the meter in accordance with flow driven rotation within the meter, wherein the current flow volume or flow rate measurement comprises a measurement of the system corresponding to one of the plurality of load states connected to the meter comprising the plurality of separate load devices; and
determine a proving result in accordance with a comparing of the current flow volume or flow rate measurement corresponding to one of the plurality of load states with a corresponding baseline measurement of the one or more baseline flow measurements, wherein the proving result comprises one or more of percent proof, percent accuracy or percent error.

22. The computing device of claim 21, wherein:

Percent Proof=$(data_{ref}/data_{test}) \times (Pres_{ref}/Pres_{test}) \times (Temp_{test}/Temp_{ref}) \times 100$;

Percent Accuracy = $(data_{test}/data_{ref}) \times (Pres_{test}/Pres_{ref}) \times (Temp_{test}/Temp_{ref}) \times 100$; and Percent Error = $[(data_{test}/data_{ref}) \times (Pres_{test}/Pres_{ref}) \times (Temp_{test}/Temp_{ref}) \times 100] - 100$;

wherein $data_{ref}$ comprises the one or more baseline flow volume or flow rate measurements, $data_{test}$ comprises the current flow volume or flow rate measurement, $Pres_{ref}$ comprises a pressure value related to the one or more baseline flow volume or flow rate measurements, $Pres_{test}$ comprises a pressure value related to the current flow volume or flow rate measurement, $Temp_{ref}$ comprises a temperature value related to the one or more baseline flow volume or flow rate measurements, and $Temp_{test}$ comprises a temperature value related to the current flow volume or flow measurement.

\* \* \* \* \*